United States Patent
Cui et al.

(10) Patent No.: US 11,576,081 B2
(45) Date of Patent: Feb. 7, 2023

(54) LINK QUALITY-BASED OFFLOADING METHOD AND DEVICE IN DUAL CONNECTIVITY

(71) Applicant: Huawei Technologies Co., Ltd., Shenzhen (CN)

(72) Inventors: Liwei Cui, Xi'an (CN); Li Shen, Beijing (CN); Kai Yuan, Beijing (CN); Haibo Xu, Beijing (CN); Zhenrong Wei, Beijing (CN)

(73) Assignee: HUAWEI TECHNOLGOIES CO., LTD., Shenzhen (CN)

(*) Notice: Subject to any disclaimer, the term of this patent is extended or adjusted under 35 U.S.C. 154(b) by 111 days.

(21) Appl. No.: 17/255,257

(22) PCT Filed: Jul. 2, 2018

(86) PCT No.: PCT/CN2018/093977
§ 371 (c)(1),
(2) Date: Dec. 22, 2020

(87) PCT Pub. No.: WO2020/006653
PCT Pub. Date: Jan. 9, 2020

(65) Prior Publication Data
US 2021/0127300 A1  Apr. 29, 2021

(51) Int. Cl.
*H04W 28/08* (2009.01)
*H04W 76/19* (2018.01)
(Continued)

(52) U.S. Cl.
CPC ...... *H04W 28/0967* (2020.05); *H04B 7/0695* (2013.01); *H04L 1/187* (2013.01);
(Continued)

(58) Field of Classification Search
CPC ...... H04L 1/08; H04W 28/04; H04W 28/085; H04W 28/0967; H04W 76/19; H04B 7/0695
See application file for complete search history.

(56) References Cited

U.S. PATENT DOCUMENTS

| | | | |
|---|---|---|---|
| 2014/0321263 A1* | 10/2014 | Wu | H04W 76/19 370/216 |
| 2015/0223237 A1 | 8/2015 | Sambhwani et al. | |

(Continued)

FOREIGN PATENT DOCUMENTS

| | | |
|---|---|---|
| CN | 102045600 A | 5/2011 |
| CN | 102098732 A | 6/2011 |

(Continued)

OTHER PUBLICATIONS

3GPP TS 38.321, V15.2.0, "3rd Generation Partnership Project; Technical Specification Group Radio Access Network; NR; Medium Access Control (MAC) protocol specification (Release 15)," Jun. 2018, 73 pages.

(Continued)

*Primary Examiner* — Gary Mui
(74) *Attorney, Agent, or Firm* — Conley Rose, P.C.

(57) ABSTRACT

A data link quality-based offloading method in dual connectivity includes determining a quality of a bearer link on a user equipment UE side by determining and setting, determining a quality of a radio link by parameters or conditions such as timing advance (TA) timeout, a bit error rate, a signal strength or a signal amplitude, a threshold of continuous scheduling request (SR) sending, a radio link control (RLC) sliding window, a T310 timer, and a triggering of a beam failure recovery process, selecting, based on a determining result, a manner such as a packet replication or selecting a link, and transmitting data through two links.

16 Claims, 7 Drawing Sheets

(51) Int. Cl.

| | | |
|---|---|---|
| *H04B 7/06* | (2006.01) | |
| *H04L 1/1867* | (2023.01) | |
| *H04W 28/04* | (2009.01) | |
| *H04W 56/00* | (2009.01) | |
| *H04W 80/02* | (2009.01) | |

(52) U.S. Cl.
CPC ......... *H04W 28/04* (2013.01); *H04W 28/085* (2013.01); *H04W 56/0045* (2013.01); *H04W 76/19* (2018.02); *H04W 80/02* (2013.01)

(56) References Cited

U.S. PATENT DOCUMENTS

| | | | |
|---|---|---|---|
| 2017/0223578 A1* | 8/2017 | Hong | H04L 1/00 |
| 2017/0257183 A1 | 9/2017 | Vikberg et al. | |
| 2018/0279401 A1* | 9/2018 | Hong | H04J 11/0086 |
| 2018/0368132 A1* | 12/2018 | Babaei | H04L 1/1819 |
| 2019/0305891 A1* | 10/2019 | Tang | H04L 1/1812 |
| 2019/0327641 A1* | 10/2019 | Mok | H04W 4/40 |
| 2019/0327772 A1* | 10/2019 | Luo | H04W 76/12 |
| 2019/0387535 A1* | 12/2019 | Kim | H04W 72/1289 |

FOREIGN PATENT DOCUMENTS

| | | |
|---|---|---|
| CN | 106535269 A | 3/2017 |
| CN | 107404734 A | 11/2017 |
| CN | 107548079 A | 1/2018 |
| CN | 107852267 A | 3/2018 |

OTHER PUBLICATIONS

3GPP TS 38.323 V15.2.0, (Jun. 2018) "3rd Generation Partnership Project; Technical Specification Group Radio Access Network; NR; Packet Data Convergence Protocol (PDCP) specification (Release 15)," Jun. 2018, 26 pages.

"Institute for Information Industry (III)," Discussion on Uplink Packet Duplication, R2-1801267, 3GPP TSG-RAN WG2 NR Ad hoc 1801, Vancouver, Canada, Jan. 22-26, 2018, 3 pages, XP51386694A.

Samsung, "PBR for PDCP Duplication," R2-1803593, 3GPP TSG-RAN WG2 Meeting #101, Athens, Greece, Feb. 26-Mar. 2, 2018, 3 pages, XP51400620A.

* cited by examiner

LINK QUALITY-BASED OFFLOADING METHOD AND DEVICE IN DUAL CONNECTIVITY

CROSS-REFERENCE TO RELATED APPLICATIONS

This application is a U.S. National Stage of International Patent Application No. PCT/CN2018/093977 filed on Jul. 2, 2018, which is hereby incorporated by reference in its entirety.

TECHNICAL FIELD

Embodiments of this application relate to the communications field, and in particular, to a link quality-based offloading method in dual connectivity.

BACKGROUND

In future 5G network construction, 5G may be used as a wide area standalone, or a 5G micro cell may be used for hotspot coverage. In either networking mode, a dual connectivity technology between LTE and 5G may be used to improve radio resource utilization, reduce a system handover delay, and improve user and system performance. To implement dual connectivity between LTE and 5G, it is necessary to consider how to select a dual connectivity architecture, and consider impact brought by different architectures on a user plane protocol and a control plane protocol of 4G and those of 5G.

SUMMARY

According to one aspect, an embodiment of this application provides an offloading and transmission method, including: when an amount of data transmitted from a PDCP layer is greater than an offloading threshold, transmitting the data to an RLC layer through the first link and the second link separately according to a predefined policy; and when the amount of data transmitted from the PDCP layer is less than the offloading threshold, transmitting the data to the RLC layer through the first link, where the transmitted data includes to-be-transmitted data at the PDCP layer and data cached at the RLC layer, and the predefined policy may be evenly allocating data to the first link and the second link for transmission. In an implementation, the predefined policy may alternatively be proportionally allocating the data to the first link and the second link for transmission. In this way, a bearer link can be efficiently used for data transmission.

According to another aspect, in a possible implementation of this application, an offloading and transmission method is further provided, including: transmitting first data to an RLC layer through a first link, and transmitting second data to the RLC layer through a second link; replicating the first data when the first link meets a first condition; and transmitting the replicated first data to the RLC layer through the first link, and transmitting the replicated first data to the RLC layer through the second link. In a possible implementation, the method further includes: replicating third data, transmitting the replicated third data to the RLC layer through the first link, and transmitting the replicated third data to the RLC layer through the second link. This prevents a data loss during transmission.

In a possible implementation of this application, the first condition may be that a first parameter is greater than or less than a threshold. The first parameter is one or more of the following: TA timeout, a MAC layer bit error rate, signal received strength, a maximum value of continuous SR sending, and an RLC sliding window. This may implement a plurality of conditions for determining transmission link quality.

The first condition is one or more of the following: a T310 timer is started, and a beam failure recovery procedure is triggered at a MAC layer. This may implement the plurality of conditions for determining the transmission link quality.

According to another aspect, in a possible implementation of this application, first data is transmitted to an RLC layer through a first link, and second data is transmitted to the RLC layer through a second link. When the first link meets a first condition, third data is transmitted to the RLC layer through the second link. A link with better quality may be selected to transmit the data.

According to another aspect, this application further provides a terminal device for performing the foregoing method, and an instruction for performing the foregoing method. The instruction is included in a program product and a readable storage medium.

It should be noted that embodiments of this application may be randomly combined to achieve different technical effects.

According to the foregoing solution, in the embodiments of this application, in an offloading mode, transmission quality of a link can be determined based on a condition or a parameter, to implement data replication. Then, data is transmitted again through two links. This can resolve a problem of a packet loss, improve reliability, and reduce retransmission.

DESCRIPTION OF EMBODIMENTS

In a wireless system, when coordinated networking is performed on base stations or access points of different standards, a same standard, and different systems, because a bandwidth resource and a coverage area of a single base station are limited, radio resources of a plurality of cells or base stations are centralized to provide a service for a user. This can meet a capacity requirement and a coverage requirement of the user more easily. Usually, this manner is referred to as multi-connection.

An LTE system is used as an example. Common multi-connection manners include carrier aggregation, CoMP (Coordinated Multipoint transmission/reception), dual connectivity, and the like. Specifically, the dual connectivity (Dual Connectivity, DC for short) refers to an operation mode of UE (terminal device) in an RRC (Radio Resource Control Layer, radio link control layer) connected mode. A master cell group (Master Cell Group) and a secondary cell group (Secondary Cell Group) are configured for the UE (terminal device). This provides a performance solution for the base station under a non-ideal backhaul condition. In this manner, to avoid a delay and a synchronization requirement in a scheduling process at a MAC (Media Access Control, media access control) layer, data is split and combined at a PDCP (Packet Data Convergence Protocol, packet data convergence) layer, and then a user data flow is transmitted to the user through a plurality of base stations at the same time. This helps to improve user performance, which is helpful to overall user throughput and a handover delay. When the dual connectivity is applied in the LTE system, after the data is split on a core network or at the PDCP layer, the user data flow is transmitted to the user through the plurality of base stations at the same time. There are a plurality of choices for the core network and a wireless network. In addition, when the dual connectivity is applied, data bearer and the like need to be considered.

Figure 1:
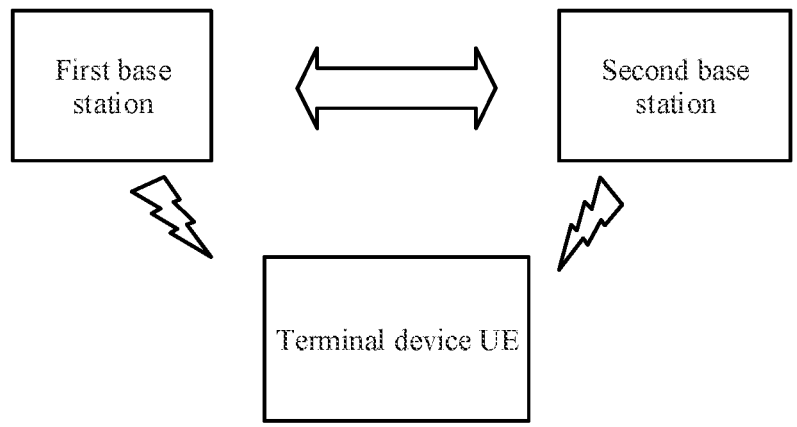
FIG. 1 is a schematic diagram 1 of dual connectivity according to a possible implementation of this application.

It should be noted that, in this application, dual connectivity between 4G LTE (Long Term Evolution, long term evolution) and 5G NR (New Radio, 5G access network) is used as an example. This is not limited to a connection between LTE and 5G. In a possible implementation, there may be a connection between a plurality of different communications standards, for example, between 4G and 5G. As shown in FIG. 1, a first base station may be an LTE eNB base station, and a second base station may be a gNB base station. In a possible implementation, there may be a connection between base stations of different types in a same generation of communications technology, for example, between an LTE base station and an enhanced LTE base station (eNB). In a possible design, there may be a connection between different access points or systems, for example, between an LTE access point and an access point such as WI-FI or Bluetooth. In a possible design, this application may also be extended to a multi-connection technology. For example, a plurality of base stations of different standards, or a system formed by different systems such a base station and Wi-Fi.

An existing 5G standard defines a plurality of networking modes, including standalone (Standalone. SA for short) and non-standalone (Non-standalone, NSA for short). The non-standalone networking mode is used as an example, including a plurality of possible modes such as Option 3/3a/3x, Option 4/4a, and Option 7/7a/7x. Option 3/3a/3x is used as an example. When a 4G base station (eNB) is a primary base station, a 5G base station (gNB) is a secondary base station, an LTE core network is still used, no new 5G core network is required, and all control plane signaling is forwarded by the eNB. There are three corresponding manners of data flow transmission: The eNB offloads data to the gNB, or an EPC (Evolved Packet Core, which is the LTE core network) offloads data to the gNB, or the gNB may offload data to the eNB. In this scenario, the eNB is the primary base station, and all the control plane signaling is forwarded by the eNB. The LTE eNB and the NR (New Radio) gNB provide a high data rate service for the user through dual connectivity.

Option 4/4a is used as an example. Both an NGC (Next Generation Core) and the gNB are introduced in Option 4. However, the gNB does not directly replace the eNB. In this scenario, a 5G NGC is used as the core network, and both the eNB and the gNB are connected to the NGC. All the control plane signaling is forwarded by the gNB. There are two corresponding manners of the data flow transmission: The gNB offloads the data to the eNB, or the NGC offloads the data to the eNB.

The foregoing provides only examples of several common typical DC connection manners. This is not limited in this application.

It should be noted that DC in a 4G-5G standard indicates that the UE maintains dual connectivity to both the 4G base station and the 5G base station, and radio resources of the two base stations are used at the same time to perform service transmission. The primary base station bears a control plane, and the primary base station and the secondary base station may bear data. Based on distribution of the data on the primary base station and the secondary base station, there may be four DC bearer types:

a. MCG bearer (the data is only on the primary base station)

b. SCG bearer (the data is only on the secondary base station)

c. MCG split bearer (the data is offloaded on the primary base station)

d. SCG split bearer (the data is offloaded on the secondary base station)

Figure 2:
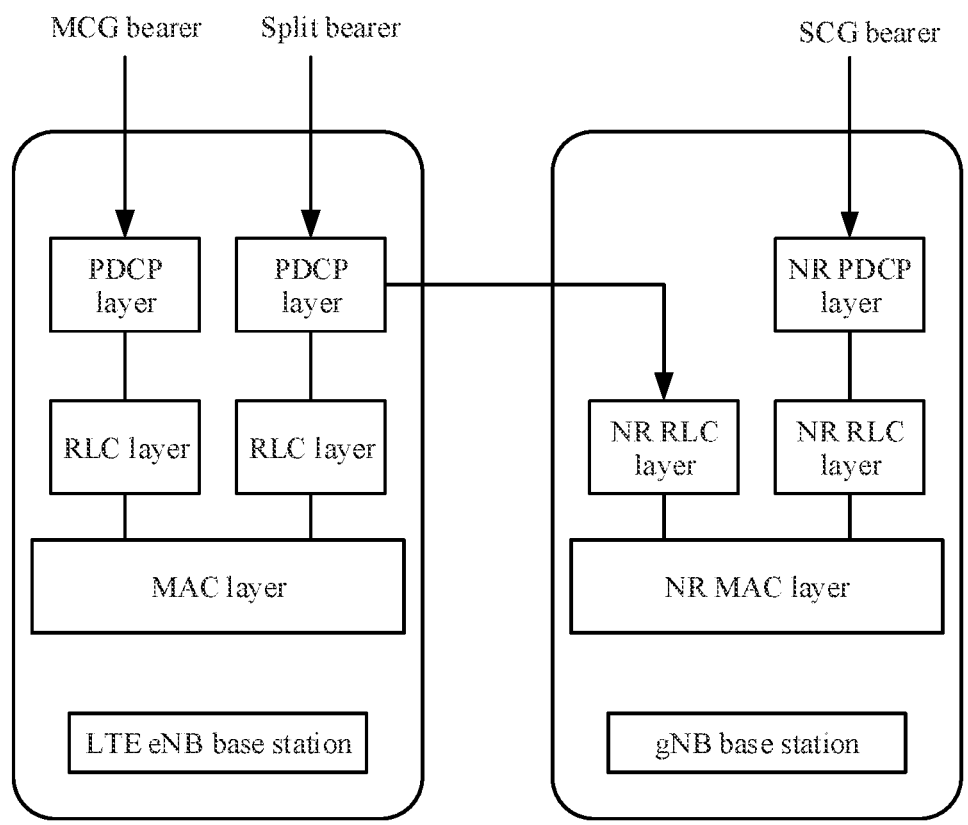
FIG. 2 is a schematic diagram 1 of data offloading according to a possible implementation of this application.

FIG. 2 is a schematic diagram 1 of data offloading according to a possible implementation of this application.

As shown in FIG. 2, in dual connectivity, downlink data transmission is used as an example. A data flow is split and combined at a PDCP (Packet Data Convergence Protocol, packet data convergence) layer, and then the data flow is transmitted to a user through a plurality of base stations at the same time. In this case, one PDCP entity may be associated with two RLC (Radio Link Control, radio link layer control protocol) entities. This may be understood as that the PDCP layer transmits the data flow to an RLC layer through an RLC link 1 and an RLC link 2. Specifically, the RLC link 1 may be understood as an LTE link, and the RLC link 2 may be understood as an NR link. Each RLC entity corresponds to an LTE air interface and an NR air interface. In this scenario, PDCP packets in the data flow from the PDCP are separately sent on the LTE air interface and the NR air interface based on an obtained grant. This manner may be referred to as an MCG split bearer mode.

Similarly, if the PDCP layer is associated with only one RLC entity, data at the PDCP layer is directly transmitted to the RLC layer. This manner is referred to as an MCG bearer (the data is transmitted only on a primary base station).

Similarly, if data is transmitted at an NR PDCP layer in this case (in other words, the data is transmitted on a secondary base station), only one NR RLC entity is associated in this case. To be specific, the data at the NR PDCP layer is directly transmitted to an NR RLC layer. This manner is referred to as an SCG bearer (the data is transmitted only on the secondary base station).

In some embodiments, each RLC entity may correspond to at least one bearer link. In some embodiments, there may be a plurality of RLC entities at the RLC layer.

Figure 3:
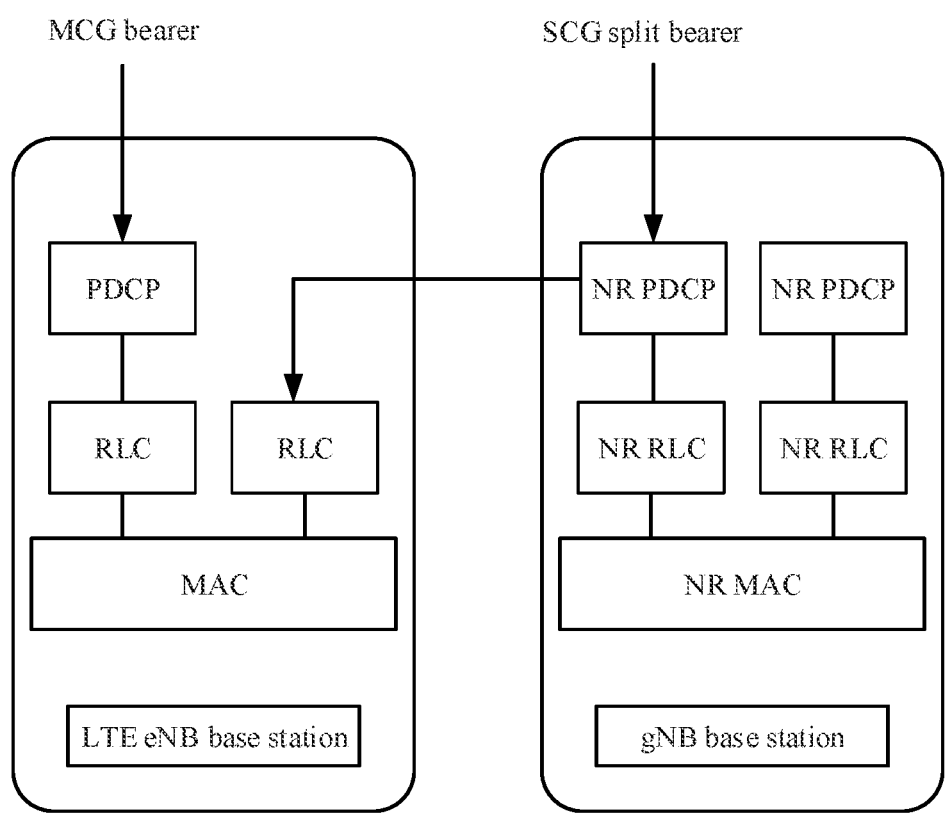
FIG. 3 is a schematic diagram 2 of data offloading according to a possible implementation of this application.

FIG. 3 is a schematic diagram 2 of data offloading according to a possible implementation of this application.

As shown in FIG. 3, an LTE eNB is a primary base station, a gNB is a secondary base station, and data is converged at an NR PDCP layer. One NR PDCP entity may be associated with two RLC (Radio Link Control, radio link layer control protocol) entities, and the two RLC entities correspond to an NR RLC layer and an RLC layer. In this case, data is offloaded on a secondary bearer. This manner is referred to as an SCG split bearer (the data is offloaded on the secondary base station).

In this case, to avoid a processing capability bottleneck of a 4G base station, minimize upgrade of an original 4G base station, and minimize costs of device research and development and network construction, it is stipulated that an SCG may split and bear LTE-NR dual connectivity. To be specific, a downlink data flow may be transmitted from a 5G secondary base station to a 4G primary base station and then to a mobile phone.

Figure 4:
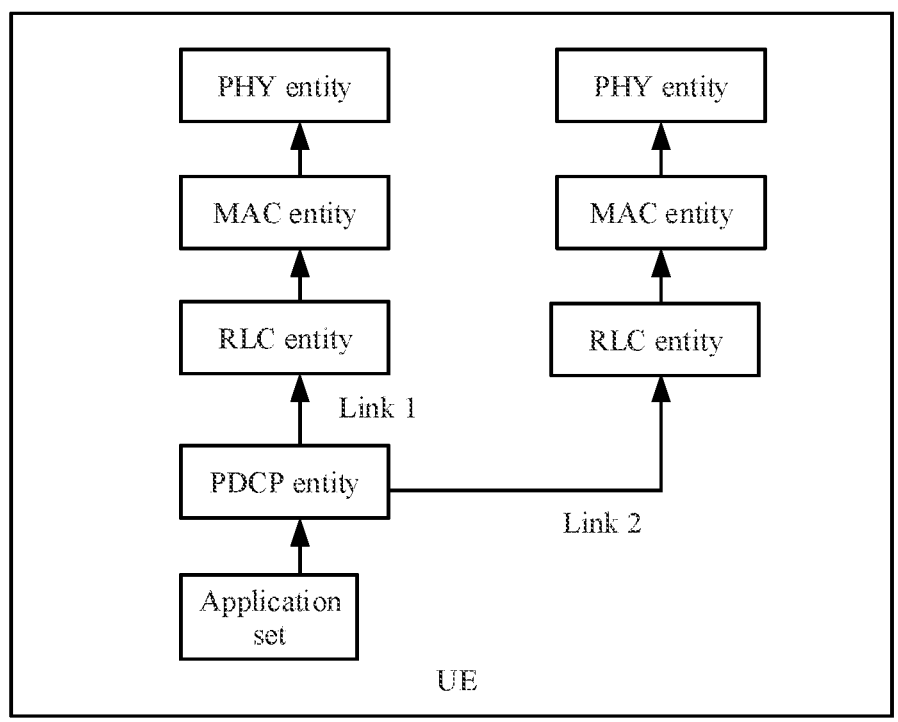
FIG. 4 is a schematic diagram 3 of data offloading according to a possible implementation of this application.

FIG. 4 is a schematic diagram 3 of data offloading according to a possible implementation of this application.

As shown in FIG. 4, during uplink data transmission, after data flows are converged at a PDCP, offloading and transmission may be performed according to a predefined policy. In some embodiments, the data flows may be evenly allocated to two links. In some embodiments, the data flow may be transmitted to the two links based on link quality. In some embodiments, if a value of a data flow transmitted from the PDCP is less than a threshold of offloading and transmission, transmission is performed on a primary bearer, for example, a link 1 shown in FIG. 4.

It should be noted that the link 1 and a link 2 in the figure are for ease of description, and are not intended to limit this application.

In some implementations, there may be a plurality of entities at one layer. For example, there may be two RLC entities at an RLC, and the two RLC entities correspond to two bearer links. This is not limited in this application.

UE (user device) in this application may be an electronic device of any application-oriented type for a consumer to use. An example of the user device includes but is not limited to a smartphone, a tablet computer, a television, a projector, a smart watch, smart glasses (for example, Google Glass), a wearable accessory (for example, a smart wristwatch, a T-shirt, a necklace, or shoes), a media (for example, music and/or video) player, a game console, a game console and controller, an electronic book (ebook) reader, a cloud terminal, or an in-vehicle media system. The user device may be a wearable device (for example, the smart watch or the smart glasses) or a non-wearable device (for example, the television or the tablet computer). In addition, the user device may have any suitable operating system (OS), for example, Android, iOS, Windows, Linux, or UNIX.

Further, the user device may support a plurality of mobile communications technologies of different standards, including 2G/3G/4G/5G, and may further support Wi-Fi, Bluetooth, and the like.

Figure 5:
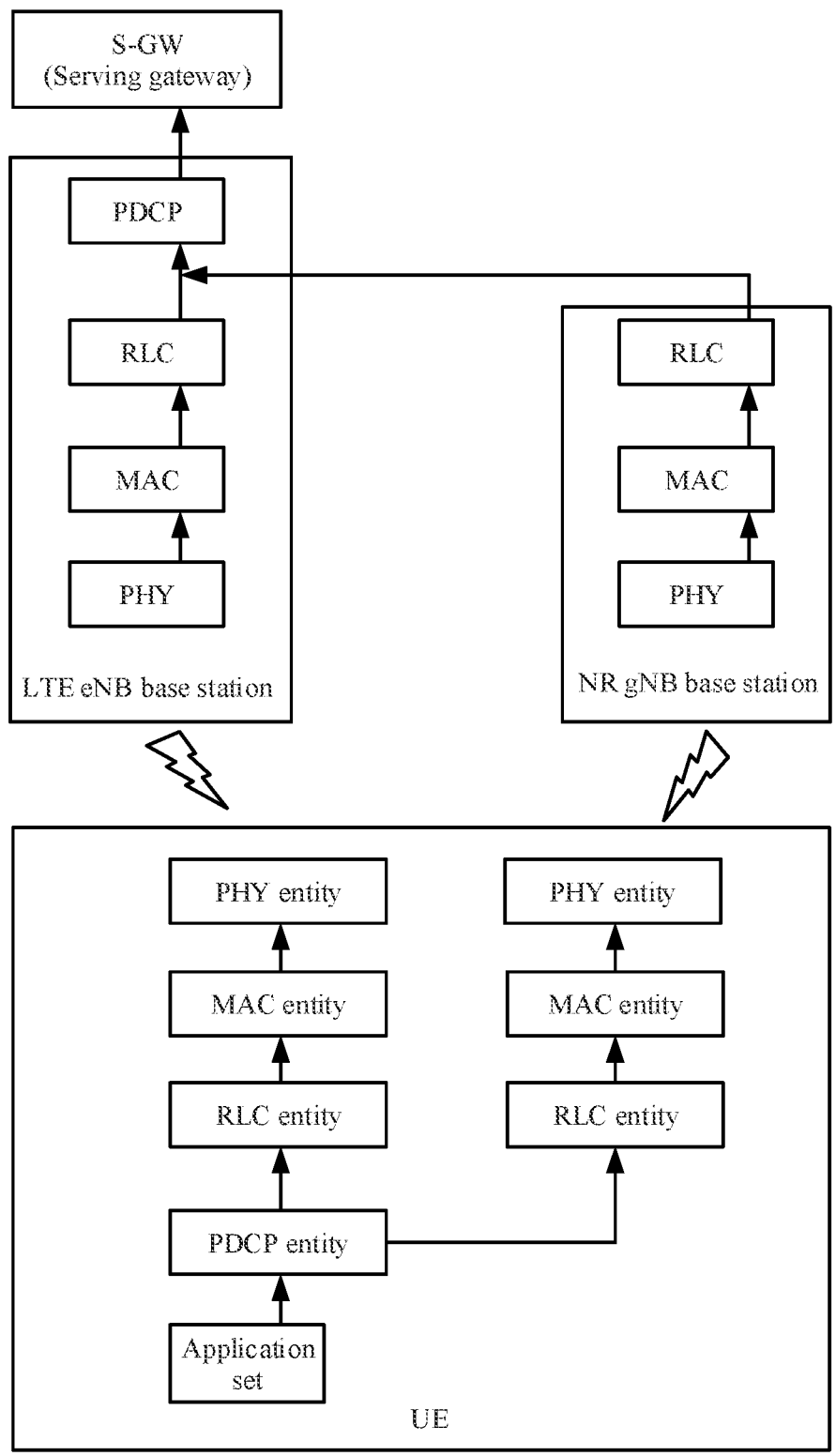
FIG. 5 is a schematic diagram 4 of data offloading according to a possible implementation of this application.

FIG. 5 is a schematic diagram 4 of data offloading according to a possible implementation of this application.

As shown in FIG. 5, in an uplink transmission process, a UE side also transmits uplink data in the foregoing bearer manner. The data is converged at a PDCP layer and transmitted to an RLC layer. When there are a plurality of PLC entities, the data may be transmitted in a split bearer mode.

As shown in FIG. 5, to implement wireless communication between a user device and a base station (for example, an eNodeB), both the user device and the base station may be logically divided into three protocol layers based on an OSI (Open System Interconnection Reference Model) framework: a physical layer (namely, a PHY layer), a data link layer (namely, a DLC layer), and an application layer and a non-access stratum. The physical layer is mainly used to provide, for a higher-layer service, a wireless physical channel for transmission. The physical layer is mainly implemented by a base station on a network side. The non-access stratum (Non-Access Stratum, NAS) is a function layer between a core network and the user device. The non-access stratum is relative to an access stratum. A protocol layer below an RRC layer may be collectively referred to as the access stratum, and signaling of the access stratum is a basis of signaling interaction of the non-access stratum. The non-access stratum supports signaling transmission and data transmission between the core network and the user device, and mainly includes an authentication function and a security control function. The application layer is mainly used to directly interface with an application program and provide a common network application service.

The data link layer is further divided into three sublayers: a media access control layer (MAC layer for short) mainly providing an interface between a radio link control layer and the physical layer, the radio link control (Radio Link Control) layer (RLC layer for short) mainly providing a segmentation service and a retransmission service for the user device and data control, and a packet data convergence protocol (Packet Data Converge Protocol) layer (PDCP layer for short), mainly configured to process a radio resource control message on a control plane and an internet protocol suite on a user plane. The application layer is mainly a radio resource control (Radio Resource Control) layer (RRC layer for short). A main function of the RRC layer is to allocate a radio resource and send related signaling. A main part of control signaling between the user device and a UTRAN (UMTS Terrestrial Radio Access Network) is an RRC message. The RRC message bears all parameters required for establishing, modifying, and releasing protocol entities at the MAC layer and the physical layer, and further carries some signaling at the non-access stratum.

In some implementations, each layer includes at least one entity. For example, the RLC layer may include an RLC entity 1 and an RLC entity 2. In some embodiments, each RLC entity corresponds to at least one bearer link, so that data may be transmitted from the PDCP layer to the RLC layer.

As shown in FIG. 5, in some embodiments, it may be understood that there are the RLC entity 1 and the RLC entity 2 at the RLC layer. The RLC entity 1 supports LTE data transmission, and the RLC entity 2 supports NR data transmission. However, this is not limited in this application.

The uplink data is used as an example. When upper-layer data is transmitted to the PDCP layer, a data packet of the upper-layer data has an SN (Serial Number, sequence number). It may be understood that the SN number is added when the data is transmitted to the PDCP layer. In a normal case, downlink PDCP data packets arrive in ascending order of SN numbers. If the PDCP packets received at a receive end are consecutive, the PDCP packets are directly delivered to an upper-layer application.

In a split mode, when the upper-layer data is transmitted to the PDCP layer, the data needs to be offloaded at the PDCP. In some cases, for example, if quality of a link is poor, a transmitted PDCP packet cannot be transmitted to a peer end in time. In this case, the receive end cannot obtain consecutive PDCP data packets. As a result, another link waits for the PDCP packets. On the contrary, if quality of the another link is poor, a same problem may occur.

Figure 6:
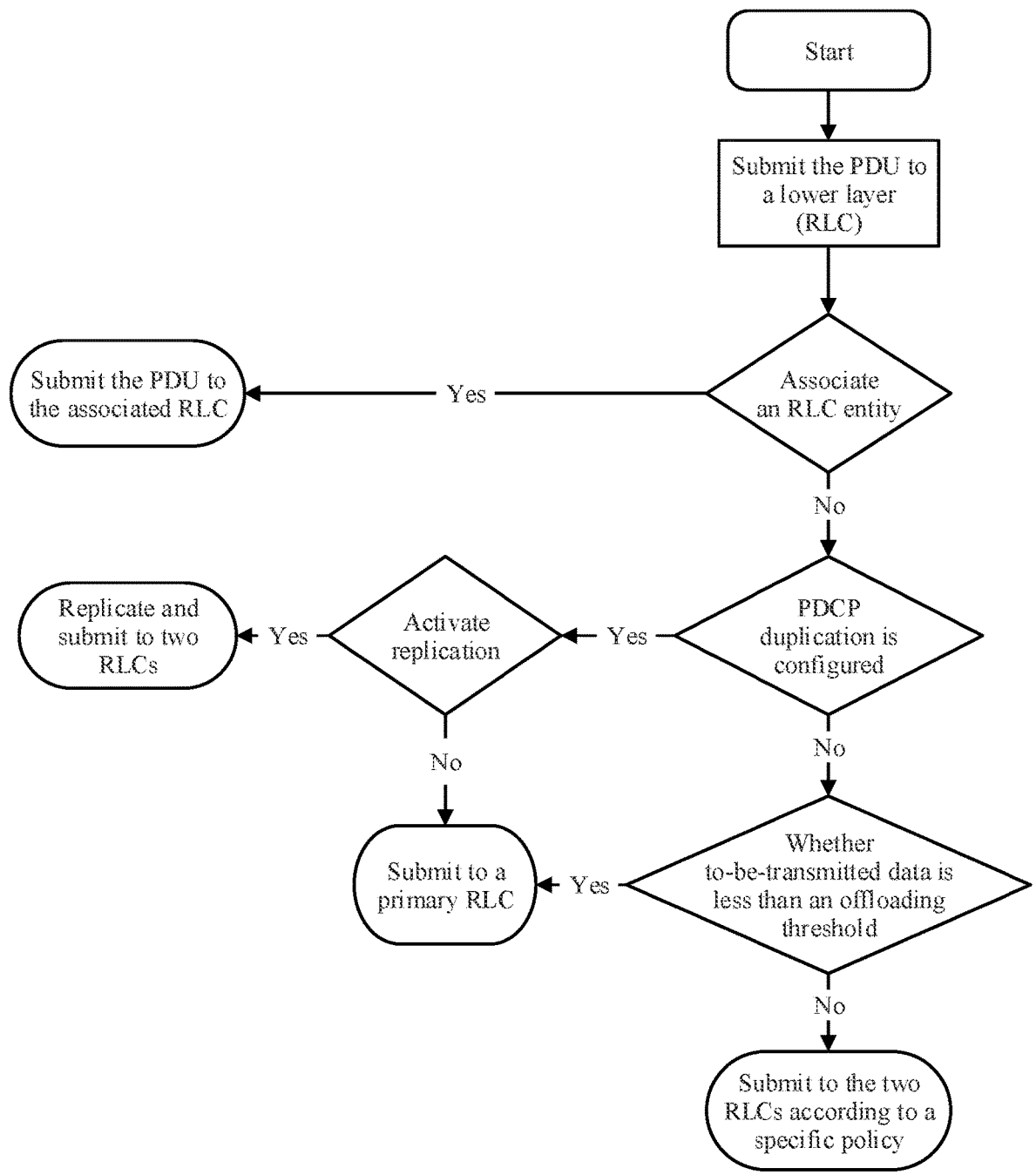
FIG. 6 is a schematic diagram 1 of a packet replication function according to a possible implementation of this application.

FIG. 6 is a schematic diagram of a packet replication function according to a possible implementation of this application.

In a possible design, a PDCP-Duplication information element in signaling is configured on a network side through RRC (Radio Resource Control Layer, radio resource control layer). The information element may be used to indicate whether a terminal device UE enables the packet replication function.

In a possible implementation, when a value of the PDCP-Duplication is set to True, or when the value may be another value that represents enabling of the packet replication function, for example, 1, the UE replicates a same PDCP packet, and then sends PDCP packets with a same SN on an RLC 1 and an RLC 2 at the same time. For example, in this case, data packets numbered SN 1, SN 2, and SN 3, namely, three consecutive data packets need to be transmitted. The PDCP-Duplication information element in the RRC signaling is configured on the network side, to enable the packet replication function. A PDCP sends the data packets numbered SN 1, SN 2, and SN 3 on the RLC 1 and the RLC 2 at the same time. The packet replication function can improve reliability and reduce retransmission.

Specifically, a submission procedure of a PDCP PDU (PDCP data packet protocol data unit) that supports a PDCP packet replication function is shown in FIG. 6.

When data is transmitted from an upper layer to a PDCP layer, whether an RLC entity is associated is determined. If it is determined that the RLC entity is associated, the PDCP layer transmits the PDCP PDU to an RLC layer.

If it is determined that at least two RLC entities are associated, whether the PDCP-Duplication is configured is monitored. In other words, whether the packet replication function is enabled is monitored. If the packet replication function is enabled, data of the PDU is replicated, and the data is transmitted to the RLC layer through at least two bearer links.

In a possible implementation, after it is detected that the PDCP-Duplication is configured, replication activation needs to be further enabled during detection. If the replication activation is enabled, a to-be-transmitted packet is replicated, and the packet is transmitted to the RLC layer through the two bearer links. If the replication activation is not enabled or activated, the data of the PDU is transmitted to the RLC layer through a primary bearer.

If it is determined that the at least two RLC entities are associated and the PDCP-Duplication is not configured, it is further determined whether an amount of to-be-transmitted data at the PDCP layer and an amount of data cached at the RLC layer are greater than a threshold. If the amounts are less than the threshold, offloading and transmission do not need to be performed, and the data may be directly transmitted through an RLC link of the primary bearer. If the amounts are greater than the threshold, offloading and transmission are performed according to a predefined rule. In a possible design, data packets may be evenly allocated to two RLC link layers for transmission. In a possible design, allocation and transmission may be performed based on link quality. In some implementations, the threshold herein is a threshold of offloading and transmission. It may be understood that when the amount of the to-be-transmitted data is greater than the threshold, the to-be-transmitted data enters an offloading mode. In other words, the to-be-transmitted data is transmitted to the RLC layer through the two bearer links.

The foregoing solution can resolve a problem of a packet loss, improve reliability, and reduce retransmission.

Figure 7:
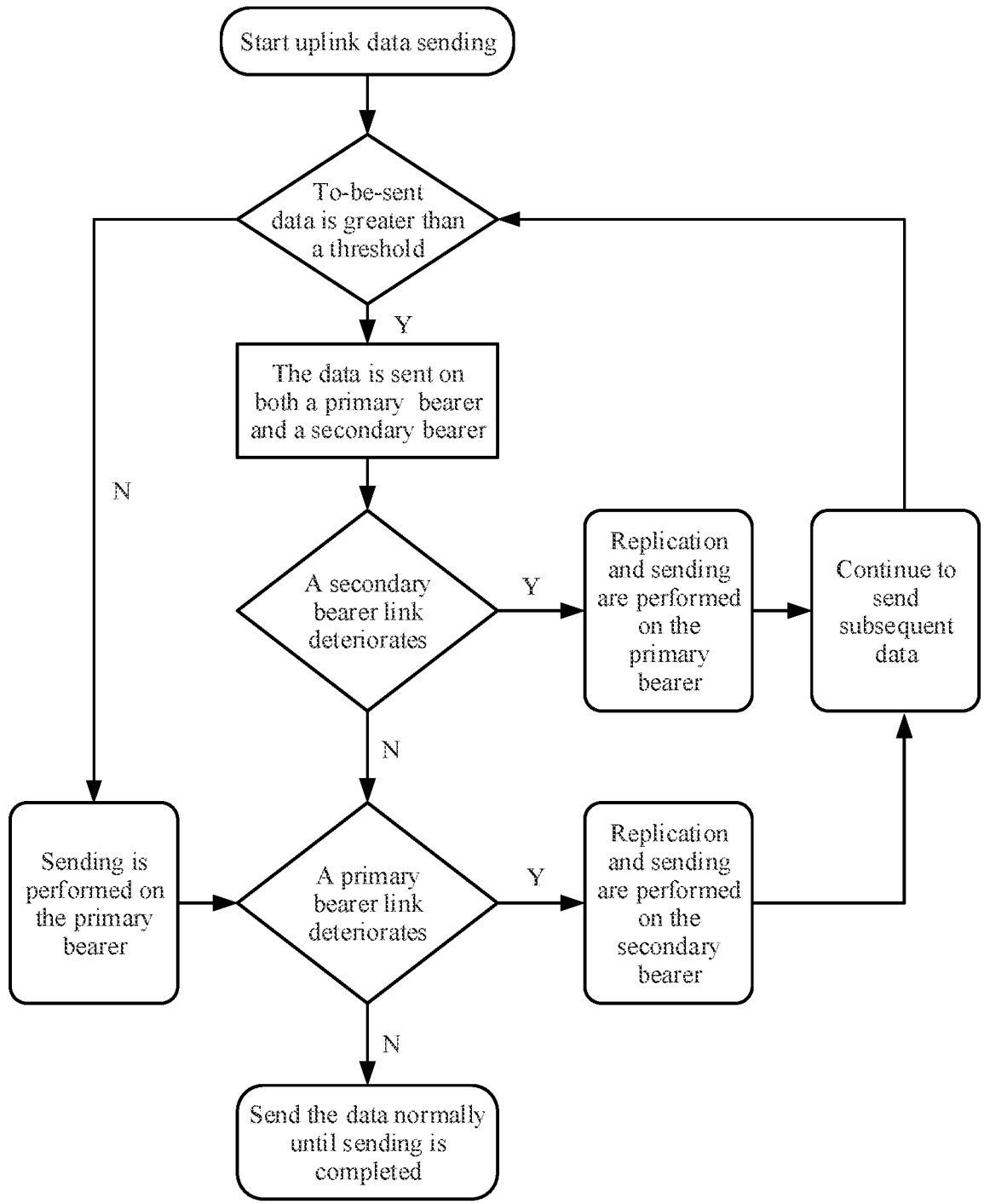
FIG. 7 is a schematic diagram 2 of a packet replication function according to a possible implementation of this application.

FIG. 7 is a schematic diagram of another packet replication function according to a possible implementation of this application.

Specifically, as shown in FIG. 7:

Step 1: In a split mode, UE sends uplink data based on a configuration on a network side.

Step 2: The UE monitors link quality. When quality of a bearer link deteriorates, packet replication is performed on a bearer link with better quality. For example, when it is detected that quality of a primary bearer link is worse than that of a secondary bearer link, the packet replication function is enabled. For another example, as shown in FIG. 4, when quality of a link 1 deteriorates, the packet replication function is enabled, and data packets are transmitted through the link 1 and a link 2 at the same time.

Step 3: When the link with poor transmission quality recovers, stop the packet replication and perform offloading and transmission based on the previous configuration.

For example, in the split mode, an SN 1, an SN 2, and an SN 3 are transmitted on the primary bearer link, and an SN 4, an SN 5, and an SN 6 are transmitted on the secondary bearer link. In this case, it is detected that the quality of the primary bearer link deteriorates, and the packet replication function is enabled. First, the SN 1, the SN 2, and the SN 3 are retransmitted on the secondary bearer link, and are also retransmitted on the primary bearer link. Then, an SN 7, an SN 8, and an SN 9 are replicated and transmitted on the primary bearer link and the secondary bearer link at the same time. In other words, after the packet replication function is enabled, subsequent data can be replicated and transmitted on the two bearer links.

Herein, the primary bearer link, the secondary bearer link, the link 1, and the link 2 are not limited, and are merely for ease of description. In some embodiments, the bearer link may be understood as a logical channel, a transmission channel, or the like inside the UE.

Specifically, in this embodiment, the link quality is used as a determining condition, and a condition for determining the link quality includes the following several types.

In a possible implementation, a parameter for determining the link quality may be TA.

Specifically, the TA (Timing Advance, timing advance) is usually used for uplink transmission of UE. The TA refers to that, to enable an uplink data packet from the UE to arrive at an eNB at a desired time point, a radio frequency transmission delay caused by a distance is estimated, and the data packet is sent in advance at a corresponding time point. UE far away from the eNodeB has a relatively large transmission delay. Therefore, the UE needs to send uplink data in advance compared with UE near the eNodeB. The eNodeB can correctly decode the uplink data as long as the eNodeB receives the uplink data from the UE within a CP (Cyclic Prefix) range. Therefore, uplink synchronization requires that time points at which signals from different UE in a same subframe arrive at the eNodeB fall within the CP.

A MAC entity uses a time alignment timer to control TA timeout. If random access is implemented, but the time alignment timer associated with a serving cell is not started, the MAC entity cannot perform any uplink sending on the serving cell. When a MAC CE (Media Access Control control element, MAC control element) of a timing advance command is received, the time alignment timer is started or reset.

For example, the UE determines that quality of a link deteriorates, and the UE may determine whether TA times out or receive an SRS signal. In some embodiments, a critical value may be further set, and the critical value may be a specified empirical threshold, including a quantity of times for which the threshold is reached and a percentage of that the threshold is exceeded within a time period. In some embodiments, two critical values may be further set, for example, a threshold start and a threshold stop. If an actual value obtained by the UE is smaller than the threshold start, it indicates that the link quality deteriorates. If the actual value obtained by the UE is greater than the threshold stop, it indicates that the link quality becomes better. For example, a quantity of times of the TA timeout or a percentage of that the threshold is exceeded within a specified time period may be set. When the quantity of times or the percentage is greater than the critical value, it indicates that the link quality deteriorates. Similarly, the quantity of times of the TA timeout or the percentage of that the threshold is exceeded within the specified time period may be set. When the quantity of times or the percentage is smaller than the critical value, it indicates that the link quality becomes better. In some implementations, one threshold threshold may alternatively be set.

In a possible implementation, the parameter for determining the link quality may be a MAC layer bit error rate.

The bit error rate is a percentage of a bit error in transmission to a total amount of transmitted code. The bit error rate herein refers to a physical layer bit error collected at a MAC layer, namely, a block transmission bit error or a block error rate. In a wireless network, a device (for example, the eNodeB) sends data to another device (for example, the UE) by block (block, namely, a TB). A transmit end calculates CRC (cyclic redundancy check, cyclic redundancy check) by using data in a block, and sends the CRC to a receive end together with the block. The receive end calculates CRC based on the received data, and compares the CRC with the received CRC. If the CRC is the same as the received CRC, it is considered that the receive end successfully receives correct data, and the receive end returns an "ACK" (acknowledgement, acknowledgment) to the transmit end. If the two CRCs are different, it is considered that the receive end receives incorrect data, and the receive end returns a "NACK" to the transmit end, to request the transmit end to retransmit the block.

In LTE, a target BLER (Block Error Rate, block error rate) of a control channel is 1%, and a target BLER of a data channel is 10%. When the BLER does not exceed 10%, the UE reports, to the eNodeB, a highest MCS (modulation and coding scheme, modulation and coding scheme) that can be decoded by the UE, and the highest MCS may be reported through CQI (Channel Quality Information, channel quality information).

In some embodiments, the link quality may be determined based on the bit error rate. For example, the two critical values may be set, for example, the threshold start and the threshold stop. When the bit error rate exceeds a specific threshold (threshold stop), it indicates that the link quality deteriorates. When the bit error rate is less than a preset threshold (threshold start), it indicates that the link quality becomes better. In some implementations, one critical value may alternatively be set.

In a possible implementation, the parameter for determining the link quality may be signal strength.

The signal strength may be RSRP (Reference Signal Receiving Power, reference signal received power). In some embodiments, a signal strength critical value may be set, for example, the threshold start and the threshold stop. When the signal strength is greater than a specific threshold (threshold start), it indicates that the link quality becomes better. When the signal strength is less than a specific threshold (threshold stop), it indicates that the link quality deteriorates. In some implementations, one critical value (threshold) may alternatively be set.

In some embodiments, a signal change amplitude may be further used to represent the link quality. A large signal change amplitude indicates a change range of the signal strength (RSRP), a signal-to-noise ratio (SINR), or a combination thereof within a predetermined time period.

In a possible implementation, the parameter for determining the link quality may be a maximum value of continuous SR sending.

The maximum value of continuous SR sending is represented by SR-TransMax: "Maximum number of SR transmissions as described in 38.321 [3]. n4 corresponds to 4, n8 corresponds to 8, and so on". The parameter is configured on a network side through RRC signaling. When a quantity of times for which the UE sends an SR is equal to the maximum value, the UE notifies an RRC to release a PUCCH and the SRS, clears a downlink assignment and an uplink grant, and then starts a random access process.

In some embodiments, a critical value may be set. The critical value may be less than the maximum value of continuous SR sending, and a link state is estimated based on whether the critical value is exceeded. The threshold is greater than 0 and less than or equal to SR-TransMax.

In a possible implementation, a parameter for determining the link quality may be that an RLC sliding window reaches a critical value.

The RLC sliding window has an upper boundary and a lower boundary. The lower boundary refers to a start SN number of the window, and the upper boundary refers to the lower boundary+a window size. That the window reaches the critical value means that (SN NEXT—the upper boundary) is greater than the threshold start. The threshold may be equal to the upper boundary. When the window reaches the critical value, it indicates that many SNs stored on a link do not receive the ACK. Therefore, it is considered that the link quality deteriorates. If (SN NEXT—the upper boundary) is smaller than the threshold stop, a quantity of cached SNs decreases, and the link quality recovers. The threshold may be combined with a rate to improve an evaluation accuracy.

In a possible implementation, a condition for determining the link quality may be whether a T310 is started.

According to descriptions of a protocol, a condition for starting the T310 is "Upon detecting physical layer problems for the SpCell i.e. upon receiving N310 consecutive out-of-sync indications from lower layers". In other words, when a problem is detected at the physical layer, the T310 timer is started, which indicates that the link is unavailable. When the T310 stops, a task link recovers, and the link may continue to perform sending.

Specifically, the link quality may be determined based on whether the T310 timer is started. For example, when it is detected that the T310 on a link is started, it indicates that link quality deteriorates. When it is detected that the T310 stops, it indicates that the link quality recovers.

In a possible implementation, the condition for determining the link quality may be that a beam failure recovery process (Beam failure recovery procedure) is triggered at the MAC layer.

The beam failure recovery procedure is used to indicate a new SSB (Synchronization Signal Block, synchronization signal block) or a CSI-RS (channel state information-reference signal, channel state information reference information) to a serving gNB when a beam failure is detected at a bottom layer. The lower layer detects the beam failure and notifies the MAC entity of the beam failure. After receiving a beam failure notification, the MAC entity starts a beam recovery timer and starts the random access process. If the timer times out, an upper layer is notified of that beam recovery fails. Therefore, when the beam failure recovery is triggered at the MAC layer, it indicates that the link is unavailable. After the beam failure recovery is complete, it is considered that the link recovers.

Specifically, the condition for determining the link quality may be detecting whether the beam failure recovery is triggered at the MAC layer. When the beam failure recovery is triggered at the MAC layer, it indicates that the link is unavailable. After the beam failure recovery is complete, it is considered that the link recovers.

It should be noted that the foregoing parameters or conditions are used to represent the link quality. In some possible implementations, any one of the foregoing parameters or conditions, and a plurality of combinations of the parameters and the conditions may be used.

Compared with the packet replication function provided in FIG. 6, the solution provided in FIG. 7 can resolve a problem that in the split mode, the receive end receives the SN 4, the SN 5, and the SN 6 but cannot receive the SN 1, the SN 2, and the SN 3 in time because of poor quality of the link 1. This problem results in decrease of the rate and retransmission of a packet of an upper-layer App. Quality of a radio link is determined on a UE side. Based on a determining result, the packet is transmitted on a link with better quality as much as possible through a manner such as data replication or preferentially selecting a link. This improves system reliability and performance.

Figure 8:
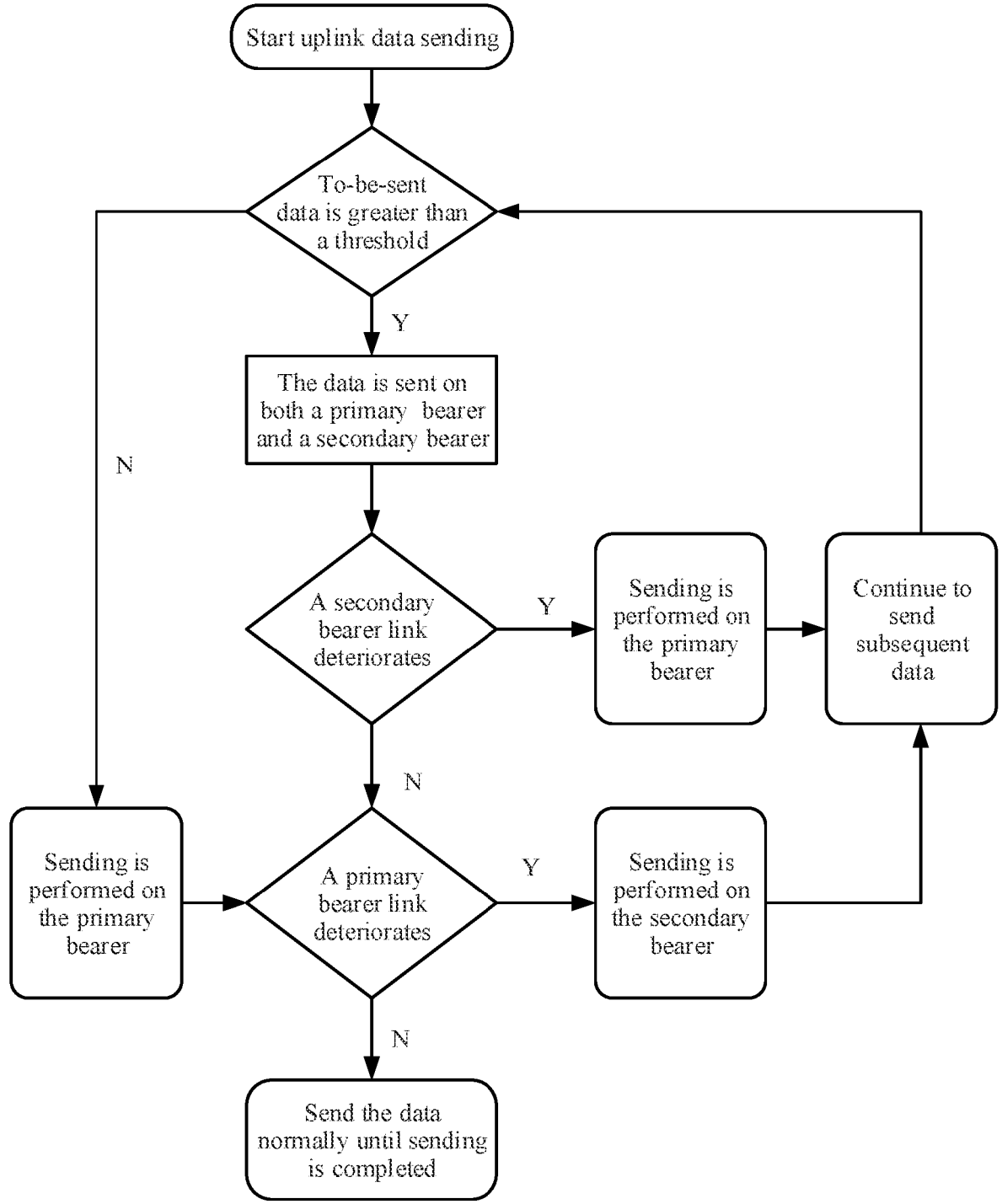
FIG. 8 is a schematic diagram 1 of preferentially selecting a link according to a possible implementation of this application.

FIG. 8 is a schematic diagram of preferentially selecting a link according to a possible implementation of this application.

Specifically, as shown in FIG. 8, a detailed procedure is as follows:

Step 1: In a DC mode, UE sends uplink data based on a configuration on a network side.

Step 2: The UE monitors link quality of a primary bearer and link quality of a secondary bearer. When the link quality of the primary bearer deteriorates, data originally sent on the deteriorated bearer is scheduled to a bearer with a good link for sending, and no PDCP packet is allocated to the deteriorated bearer.

Similarly, when the link quality of the secondary bearer deteriorates, data originally sent on the deteriorated bearer is scheduled to a bearer with good link quality for sending, and no PDCP packet is allocated to the deteriorated bearer.

Step 3: The UE monitors that when a link of the deteriorated bearer recovers, a transmission mode before scheduling is returned.

For example, an SN 1, an SN 2, and an SN 3 are transmitted on an LTE link, and an SN 4, an SN 5, and an SN 6 are transmitted on an NR link. In this case, if it is detected that quality of the LTE link deteriorates, an SN 7, an SN 8, and an SN 9 are subsequently transmitted only on the NR link with better quality.

Compared with the embodiment provided in FIG. 7, in this embodiment, in the split mode, when it is detected that link quality of a link A is poor, a data packet is preferentially sent through a link B with good quality.

The technical solutions of the embodiments of this application may be applied to various communications systems, such as: a global system for mobile communications (Global System of Mobile communication, GSM) system, a code division multiple access (Code Division Multiple Access. CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, LTE time division duplex (Time Division Duplex, TDD), a universal mobile telecommunications system (Universal Mobile Telecommunication System, UMTS), a worldwide interoperability for microwave access (Worldwide Interoperability for Microwave Access, WiMAX) communications system, a future 5th generation (5th Generation, 5G) system, or a new radio (New Radio, NR) system.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another place. The storage medium may be any available medium accessible to a computer. The following provides an example but does not impose a limitation: The computer-readable medium may include a RAM, a ROM, an EEPROM, a CD-ROM, another compact disc storage or magnetic disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in fixation of a medium to which they belong. A disk (Disk) and a disc (disc) used in this application include a compact disc (CD), a laser disc, an optical disc, a digital versatile disc (DVD), a floppy disk, and a Blu-ray disc. The disk usually copies data in a magnetic manner, but the disc copies data optically through a laser. The foregoing combination should also be included in the protection scope of the computer-readable medium.

In summary, the foregoing descriptions are merely embodiments of the technical solutions of this application, but are not intended to limit the protection scope of this application. Any modification, equivalent replacement, or improvement made according to the disclosure of this application shall fall within the protection scope of this application.

What is claimed is:

1. A method, comprising:
    transmitting first data to a Radio Link Control (RLC) layer through a first link;
    transmitting second data to the RLC layer through a second link;
    replicating the first data to obtain replicated first data when the first link satisfies a first condition, wherein the first condition is at least one of:
        a T310 timer is started; or
        a beam failure recovery procedure is triggered at a media access control (MAC) layer;
    transmitting the replicated first data to the RLC layer through the first link; and
    transmitting the replicated first data to the RLC layer through the second link.

2. The method of claim 1, wherein the first link is a fourth generation (4G) link, and wherein the second link is a fifth generation (5G) link.

3. The method of claim 1, wherein both the first link and the second link are fifth generation (5G) links.

4. The method of claim 1, further comprising:
replicating third data to obtain replicated third data;
transmitting the replicated third data to the RLC layer through the first link; and
transmitting the replicated third data to the RLC layer through the second link.

5. The method of claim 4, further comprising transmitting the first data, the second data, and the third data from a Packet Data Convergence Protocol (PDCP) layer to the RLC layer.

6. The method of claim 1, further comprising:
transmitting the first data to a first access point through the first link;
transmitting the second data to a second access point through the second link; and
transmitting the replicated first data to the second access point through the second link.

7. The method of claim 1, wherein the first link corresponds to a first RLC entity, wherein the second link corresponds to a second RLC entity, and wherein the first RLC entity and the second RLC entity are located at the RLC layer.

8. A communications apparatus, comprising:
a non-transitory computer-readable storage medium configured to store programming instructions; and
a processor coupled to the non-transitory computer-readable storage medium and configured to execute the programming instructions to cause the communications apparatus to:
transmit first data to a Radio Link Control (RLC) layer through a first link;
transmit second data to the RLC layer through a second link;
replicate the first data to obtain replicated first data when the first link satisfies a first condition, wherein the first condition is at least one of:
a T310 timer is started; or
a beam failure recovery procedure is triggered at a media access control (MAC) layer;
transmit the replicated first data to the RLC layer through the first link; and
transmit the replicated first data to the RLC layer through the second link.

9. The communications apparatus of claim 8, wherein the first link comprises a fourth generation (4G) link, and wherein the second link comprises a fifth generation (5G) link.

10. The communications apparatus of claim 8, wherein both the first link and the second link are fifth generation (5G) links.

11. The communications apparatus of claim 8, wherein the programming instructions further cause the communications apparatus to:
replicate third data to obtain replicated third data;
transmit the replicated third data to the RLC layer through the first link; and
transmit the replicated third data to the RLC layer through the second link.

12. The communications apparatus of claim 11, wherein the programming instructions further cause the communications apparatus to transmit the first data, the second data, and the third data from a Packet Data Convergence Protocol (PDCP) layer to the RLC layer.

13. The communications apparatus of claim 8, wherein the programming instructions further cause the communications apparatus to:
transmit the first data to a first access point through the first link;
transmit the second data to a second access point through the second link; and
transmit the replicated first data to the second access point through the second link,
wherein the first link corresponds to a first RLC entity,
wherein the second link corresponds to a second RLC entity, and
wherein the first RLC entity and the second RLC entity are located at the RLC layer.

14. A communications apparatus, comprising:
a non-transitory computer-readable storage medium and configured to store programming instructions; and
a processor coupled to the non-transitory computer-readable storage medium and configured to execute the programming instructions to cause the communications apparatus to:
transmit first data to a Radio Link Control (RLC) layer through a first access point;
transmit second data to a second access point through a second link;
replicate the first data to obtain replicated first data when a first link satisfies a first condition, wherein the first condition is at least one of:
a T310 timer is started; or
a beam failure recovery, procedure is triggered at a media access control (MAC) layer;
transmit the replicated first data to the first access point through the first link; and
transmit the replicated first data to the second access point through the second link,
wherein the first access point is a fourth generation (4G) base station, and
wherein the second access point is a fifth generation (5G) base station.

15. The communications apparatus of claim 14, wherein the programming instructions further cause the communications apparatus to:
replicate third data to obtain replicated third data;
transmit the replicated third data to the RLC layer through the first link; and
transmit the replicated third data to the RLC layer through the second link.

16. The communications apparatus of claim 15, wherein the programming instructions further cause the communications apparatus to transmit the first data, the second data, and the third data from a Packet Data Convergence Protocol (PDCP) layer to the RLC layer.

* * * * *